United States Patent
Cheng (10) Patent No.: US 12,072,729 B2
(45) Date of Patent: Aug. 27, 2024

(54) DEVICE AND METHOD FOR SELECTING CLOCK FREQUENCY IN MASTER DEVICE OF BUS SYSTEM

(71) Applicant: NUVOTON TECHNOLOGY CORPORATION, Hsinchu (TW)

(72) Inventor: Nai-Wen Cheng, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 53 days.

(21) Appl. No.: 18/095,194

(22) Filed: Jan. 10, 2023

(65) Prior Publication Data

US 2023/0341887 A1    Oct. 26, 2023

(30) Foreign Application Priority Data

Apr. 26, 2022    (TW) .................................. 111115873

(51) Int. Cl.
   *G06F 1/00*     (2006.01)
   *G06F 1/08*     (2006.01)
   *G06F 13/42*    (2006.01)

(52) U.S. Cl.
   CPC ............ *G06F 1/08* (2013.01); *G06F 13/4291* (2013.01)

(58) Field of Classification Search
   CPC ............................... G06F 1/08; G06F 13/4291
   See application file for complete search history.

(56) References Cited

U.S. PATENT DOCUMENTS

| | | | |
|---|---|---|---|
| 9,959,223 B2* | 5/2018 | Du | G06F 13/24 |
| 2011/0072297 A1* | 3/2011 | Huang | G06F 13/4282 |
| | | | 710/110 |
| 2013/0246831 A1* | 9/2013 | Yuzawa | G06F 1/12 |
| | | | 713/400 |
| 2014/0136875 A1* | 5/2014 | Chen | G06F 1/04 |
| | | | 713/501 |
| 2014/0207879 A1* | 7/2014 | Tu | H04W 56/00 |
| | | | 709/206 |
| 2014/0337553 A1* | 11/2014 | Du | G06F 13/24 |
| | | | 710/267 |
| 2018/0032307 A1* | 2/2018 | Khazin | G06F 1/08 |
| 2019/0033910 A1* | 1/2019 | Eder | G06F 13/40 |

* cited by examiner

*Primary Examiner* — Xuxing Chen
(74) *Attorney, Agent, or Firm* — MUNCY, GEISSLER, OLDS & LOWE, PC (57) ABSTRACT

To increase an overall access speed and a performance of a bus system, in the present disclosure, a master device is designed to use a clock signal with different clock frequencies to address slave devices and read/write data from/to the slave devices. In an address phase, a first operating frequency which the master device can successfully address the slave devices is used as a clock frequency of the clock signal for addressing. In a read/write phase, a minimum one (i.e., a second operating frequency) of multiple working frequencies of the slave devices is used as the clock frequency of the clock signal for reading/writing, wherein the master device is connected to the slave devices via a bus. The working frequency of the slave device means a maximum clock frequency supported by the slave device.

18 Claims, 6 Drawing Sheets

DEVICE AND METHOD FOR SELECTING CLOCK FREQUENCY IN MASTER DEVICE OF BUS SYSTEM

BACKGROUND OF THE DISCLOSURE

1. Field of the Disclosure

The present disclosure relates to a master device of a bus system and especially is a device and method for selecting clock frequency in master device of bus system, which may effectively improve the overall access speed and performance of the bus system.

2. Description of the Related Art

Inter-Integrated Circuit (I2C) is a serial communication bus circuit, and it allows a master device connect to multiple slave devices via a bus. When a general purpose microcontroller (MCU) is used for I2C related products, sometimes the MCU needs to be used as the master device of I2C, and controls and transmits data on I2C bus by using a set of I2C interface connected to multiple peripheral slave devices.

Currently, some slave devices may allow the master to access data with a higher bit rate (i.e. a clock signal with a higher clock frequency), but some slave devices only allow the master device to access data with a lower bit rate (i.e. a clock signal with a lower clock frequency). However, on this I2C bus, if there is a slave device with a high and low speed difference in the acceptable bit rate, the master device of the I2C bus may only select the slave device that can accept the lowest bit rate thereon, and access data from or control each slave devices on the I2C bus with the lowest bit rate. Therefore, the slave device with the higher bit rate will be forced to slow down to access data and control by the master device, resulting in a decrease in the overall performance of the I2C bus.

For example, the multiple slave devices are respectively as a first slave device, a second slave device and a third slave device, and the first slave device, the second slave device and the third slave device may respectively accept the maximum bit rates as 400 KHz, 100 KHz, and 50 KHz (i.e. the maximum acceptable operating clock frequency, after that means "working clock frequency"). In order to make the master device control and access the data of each slave device normally without error, the bit rate of the I2C clock signal (i.e. serial clock signal) which output by the master device will be set to 50 KHz.

SUMMARY OF THE DISCLOSURE

According to an aspect of the present disclosure, an embodiment of the present disclosure provides a device and a method for selecting clock frequency in a master device of a bus system, wherein the bus system comprises a master device and multiple slave devices. The master device is connected with multiple slave devices via the bus. The clock frequency selecting device includes: an address checking unit, a frequency control unit, and a clock signal generating unit. The address checking unit is configured to check whether the master device successfully uses a clock frequency as a clock signal of a first operating frequency to address the slave devices, wherein the first operating frequency is defaulted as a maximum operating clock frequency among the multiple operating clock frequencies of the slave devices, and the working frequency of the slave device is the maximum clock frequency supported by the slave device. The frequency control unit, electrically connected to the address checking unit, is configured to generate a first operating frequency setting signal based on a checking result, configured to present whether the master successfully uses the clock frequency as the clock frequency of the first operating frequency to address these slave devices, and generates a clock frequency selecting signal. The clock signal generating unit, electrically connected to the frequency control unit, is configured to set the first operating frequency of the clock signal based on the first operating frequency setting signal, and set the clock frequency as the first operating frequency or a second operating frequency based on the clock frequency selecting signal. Wherein, if the checking result is successful, then the frequency control unit controls the clock signal generating unit to make the master device use the clock frequency as the clock signal of the first operating frequency to address the multiple slave devices, and the frequency control unit controls the clock signal generating unit to make the master device use the clock frequency as the clock signal of the second operating frequency to read/write data from/to the slave devices. Wherein the second operating frequency is the lowest among the multiple working clock frequencies of the slave devices. Wherein, if the checking result is failed, then the frequency control unit generates the first operating frequency setting signal for reducing the first operating frequency, to make the addressing checking unit check again whether the master device successfully use the clock frequency as the clock signal of the first operating frequency to address the slave devices.

An embodiment of the present disclosure further provides a master device, which includes the clock frequency selection device as mentioned above.

An embodiment of the present disclosure further provides a bus system, which includes the master device and the multiple slave devices as mentioned above.

An embodiment of the present disclosure further provides a method for selecting clock frequency in a master device of a bus system, wherein the bus system includes a master and multiple slave devices, the master device is connected to the slave devices via a bus. The method for selecting clock frequency in the master device includes: checking whether the master device successfully use a clock frequency as a clock signal of a first operating frequency to address the slave devices, wherein the first operating frequency is defaulted as the maximum among multiple working clock frequencies of the slave devices, and the working frequency of the slave device means the maximum clock frequency supported by the slave devices. If the checking result is successful, the master device uses the clock frequency as the clock signal of the first operating frequency to address the slave devices, and the master device uses the clock frequency as the clock signal of a second operating frequency to read/write data from/to the slave devices, wherein the second operating frequency is the lowest among multiple working clock frequencies of the slave devices. If the checking result is failed, then the first operating frequency is reduced to check again whether the master device successfully use the clock frequency as the clock signal of the first operating frequency to address the slave devices.

In the light of the foregoing, the technical solution of the present disclosure may improve the overall access speed and performance of the bus system.

In order to further understand the technology, means, and effects of the present disclosure, reference may be made by the detailed description and drawing as follows. Accordingly, the purposes, features and concepts of the present disclosure may be thoroughly and concretely understood. However, the following detailed description and drawings are only used to reference and illustrate some implementation of the present disclosure, and they are not used to limit the present disclosure.

BRIEF DESCRIPTION OF THE DRAWINGS

The accompanying drawings are provided to enable persons having ordinary skills in the art may further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DESCRIPTION OF THE PREFERRED EMBODIMENTS

The following embodiments of the present disclosure are herein described in detail with reference to the accompanying drawings. These drawings show specific examples of the embodiments of the present disclosure. These embodiments are provided so that this disclosure will be thorough and complete, and will fully convey the scope of the disclosure to those skilled in the art. It is to be acknowledged that these embodiments are exemplary implementations and are not to be construed as limiting the scope of the present disclosure in any way. Further modifications to the disclosed embodiments, as well as other embodiments, are also included within the scope of the appended claims.

Generally, a slave device (for example, but not be limited to an I2C slave device) may be divided into two categories, one is a slave device whose circuits are all digital circuits (i.e. a pure digital circuit slave device), another one is a slave device whose part of the circuits is a digital circuit and another part of circuit is an analog circuit (i.e. a slave device of a mixed circuit). Digital circuit may include a digital logic circuit, a controlling register, a memory (for example, EEPROM) or a digital signal process unit, but not be limited to this disclosure. Analog circuit may include an analog to digital converter (ADC), a digital to analog converter (DAC) (for example, audio decoder or audio amplified) or an analog sensing circuit (for example, capacitive touching sensor, temperature sensor, humidity sensor or gravity sensor), but not be limited to the present disclosure.

The full process about the master accessing (that is, read/write) data from the slave device is that the master device addresses the device address and the register address of the slave device. After the master device receives a response from the slave device, the master verifies the slave device, and then the master device reads/writes data from the slave device. That is, the full process about the master accessing data from the slave device includes addressing phase and read/write phase. The slave device of the mixed circuit includes both digital and analog circuits. The digital circuit (for example, controlling register, logic circuit, etc.) in the slave device of the mixed circuit is mainly used in the addressing phase. The analog circuit in the slave device of the mixed circuit requires more time to process or collect data, such as the charging and discharging of the capacitor and the surrounding sensing and detecting, so that the access speed of the slave device of these mixed circuit cannot be as fast as the data access speed of the slave device of the pure digital circuit. Therefore, the bit rate of the data access of the slave device of the mixed circuit is usually not too high.

In view of this problem, in order to increase the overall access speed and performance of the bus system, the master device is configured to use the clock signal of different clock frequencies to address the slave device and read/write data from/to the slave device in the present invention. In the addressing phase, the first operating frequency, which is successfully utilized by the master device to address the multiple slave devices, as the clock frequency of the clock signal, is utilized to perform addressing. In the read/write phase, the master uses the lowest working frequency (i.e. the second operating frequency) among the multiple working frequencies of the slave devices as the clock frequency of the clock signal to read/write from/to the slave device, wherein the master is connected to the multiple slave devices via the bus, and the working frequency of the slave device means a maximum clock frequency supported by the slave device.

Furthermore, the master device will check whether the master device successfully uses the clock frequency as the clock signal of the first operating frequency to address the multiple slave devices, wherein the first operating frequency is default as the maximum one among the multiple working clock frequencies of the multiple slave devices. If the checking result is successful, the master device uses the clock frequency as the clock signal of the first operating frequency to address the multiple slave devices, and the master device uses the clock frequency as the clock signal of the second operating frequency to read/write from/to the multiple slave devices, wherein the second operating frequency is the lowest among the multiple working clock frequencies of the multiple slave device. If the checking is failed, then the first operating frequency is reduced, and the master device checks again whether the master device successfully use the clock frequency as the clock signal of the first operating frequency to address the multiple slave devices.

Simply speaking, if the checking result is failed, the address checking will be performed again with a reduced first operating frequency. And then, until the checking result is successful, the master device uses the first operating frequency in the successful checking as the clock frequency to address the multiple slave devices, and the master device uses the second operating frequency as the clock frequency to read/write data from/to the multiple slave devices. Therefore, the technical solution of the present invention can increase the overall access speed and performance of the bus system.

Figure 1:
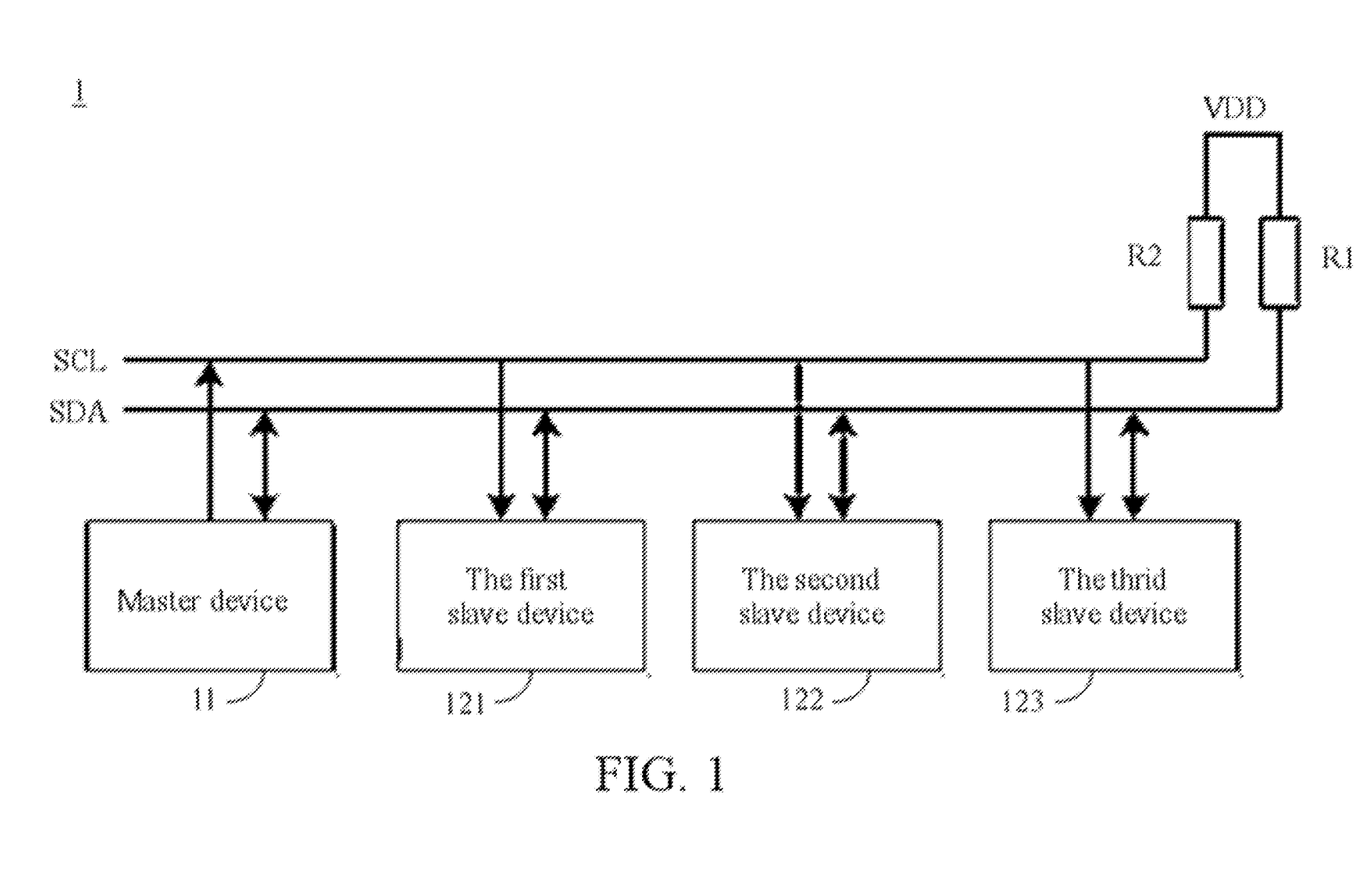
FIG. 1 is a diagram of a bus system, according to an embodiment of the present disclosure.

Please refer to FIG. 1, FIG. 1 is a diagram of a bus system, according to an embodiment of the present disclosure. The bus system 1 comprises a master device 11 and multiple slave devices (a first slave device 121, a second slave device 122, and a third slave device 123). The master device 11 is connected to the first slave device 121, the second slave device 122, and the third slave device 123 via the bus. The bus is configured to transmit serial clock signal SCL and various data SDA. The bus usually configures resistors R1, R2, and the connection node between the resistors R1, R2 receives a system voltage VDD to avoid the interference between the serial clock signal SCL and the data SDA. That is, the resistors R1, R2 are utilized as pull-up resistors, to separate the serial clock signal SCL and the data SDA on the bus. In this embodiment, for sample illustrating, the multiple slave devices include three slave devices, but the present disclosure is not limited by the number of slave devices.

Figure 2:
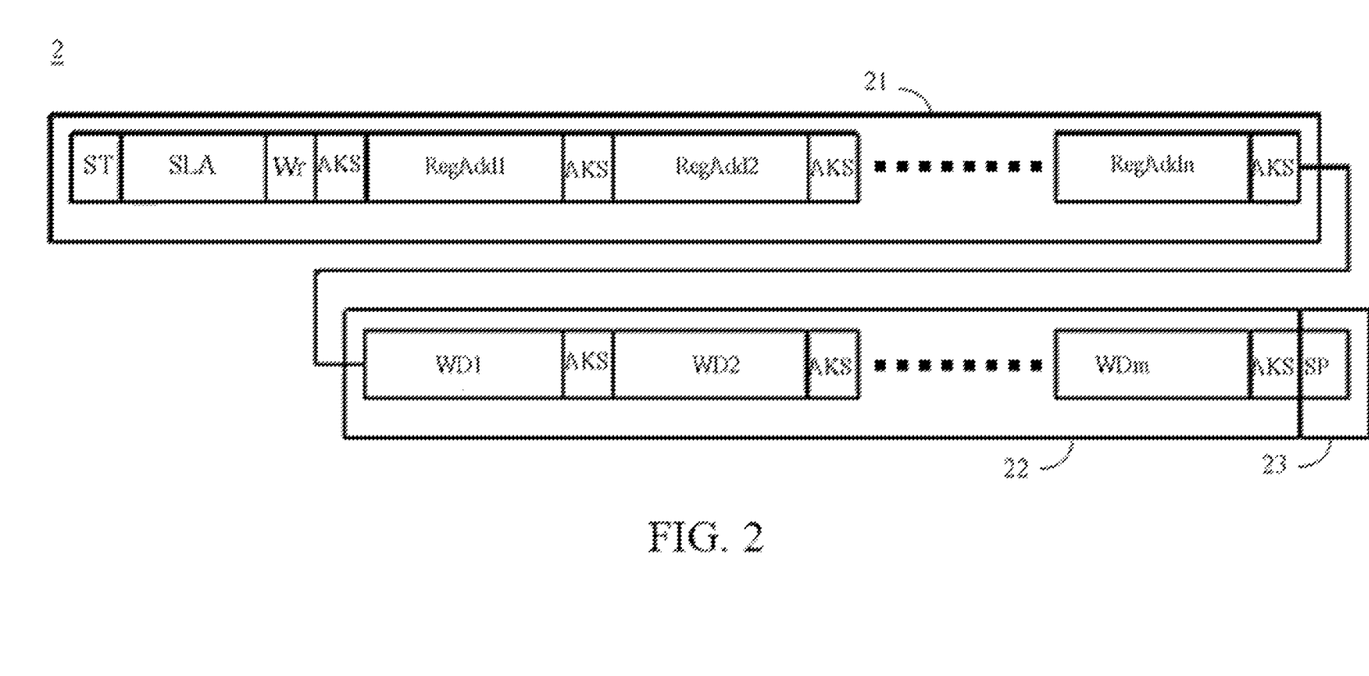
FIG. 2 is a diagram of a data frame for a master device writing data to a slave device, according to an embodiment of the present disclosure.

Please continuously refer to FIG. 2, FIG. 2 is a diagram of a data frame of a master device writing data to a slave device, according to an embodiment of the present disclosure. The data frame of the master device writing data to the slave device includes an addressing information sub-frame 21, a write-in data sub-frame 22, and an end sub-frame 23 in clock sequence. A full process of the master device accessing data from the slave device comprises an addressing phase and a read/write phase. The addressing information sub-frame 21 is the information transmitted in the addressing phase. The write-in data sub-frame 22 is the data transmitted in the read/write phase. The end sub-frame 23 is configured to finish the full process of the data accessing.

In the present disclosure, when the master device performs the transmission of the addressing information sub-frame 21 (that is, in the executing the addressing phase), the master device uses the first operating frequency, which is utilized when the checking result is successful, as the clock frequency. When the master device performs the transmission of the write-in data sub-frame 22 (that is, in the executing the read/write phase), the master device uses the second operating frequency (the minimum one among the multiple working frequencies of the multiple slave devices) as the clock frequency. When the master device performs the transmission of the end sub-frame 23, the master uses the first operating frequency, which is utilized when the checking result is successful, as the clock frequency.

The content of the addressing information sub-frame 21 respectively in clock sequence are: a start bit ST, a device address signal SLA of the slave device, a write-in bit Wr, a response bit AKS (corresponding to the device address signal SLA) of the slave device, and the combination of the continuous register address signal set (RegAdd1, RegAdd2, . . . , RegAddn) of the slave device and the response bit AKS (corresponding to the register address signals RegAdd1, RegAdd2, . . . , RegAddn) of the slave device, wherein n is the number of the registers in the slave device. The content of the write-in data sub-frame 22 respectively in sequence are: the combination of the continuous write-in data set (WD1, WD2, . . . , WDm), which are written in the slave device, and the response bit AKS (corresponds to the write-in data WD1, WD2, . . . , WDm) of the slave device, wherein m is a number of the data written in the slave device. The end sub-frame 23 includes the stop bit SP.

Figure 3:
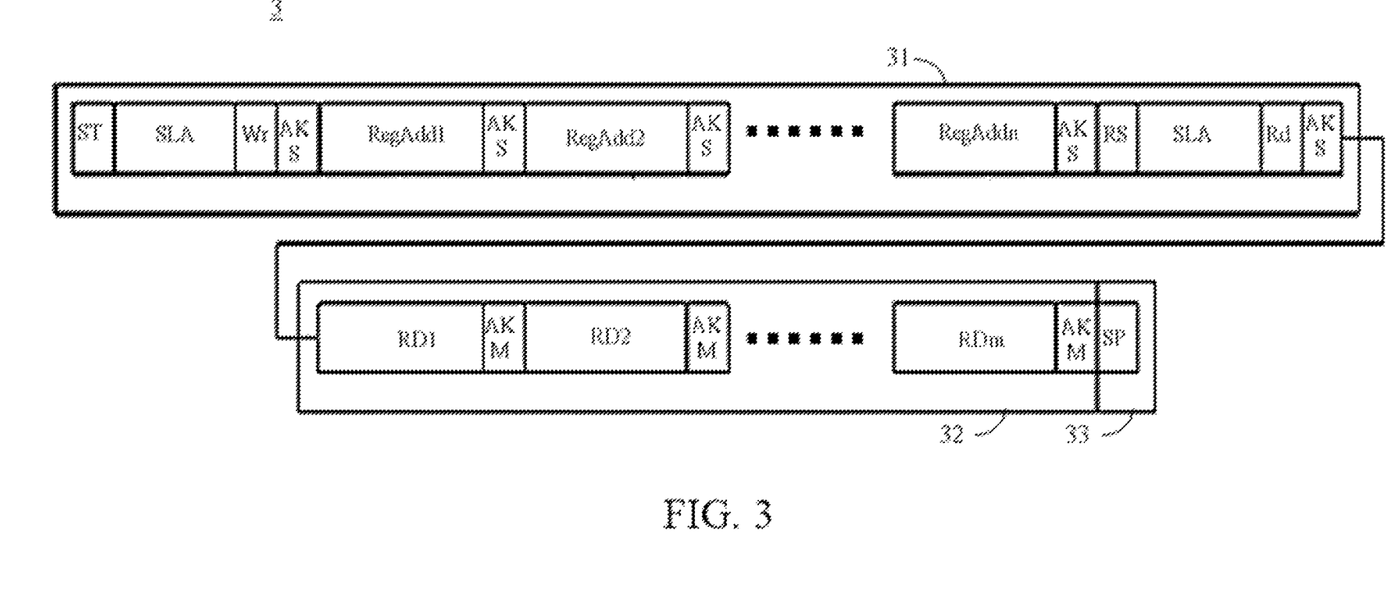
FIG. 3 is a diagram of a data frame for a master device reading data from a slave device, according to an embodiment of the present disclosure.

Please continuously refer to FIG. 3, FIG. 3 is a diagram of a data frame of a master device reading data from a slave device, according to an embodiment of the present disclosure. A data frame 3 transmitted by the master device to read data from the slave device includes addressing information sub-frame 31, reading data sub-frame 32, and end frame 33 in clock sequence. The full process of the master device accessing data from the slave device includes an address phase and a read/write phase. The address information sub-frame 31 is the information transmitted in the address phase. The reading data sub-frame 32 is the data transmitted in the read/write phase. And, the end frame 33 is configured to finish the full process of data accessing.

In the present of the disclosure, when the master device transmits the address information sub-frame 31 (that is, executing the address phase), the master device uses the first operating frequency, which is utilized when the checking result is successful, as the clock frequency. When the master device transmits the reading data sub-frame 32 (that is, executing the read/write phase), the master uses the second operating frequency (the minimum working frequency of the multiple working frequencies of the multiple slave devices) as the clock frequency. When the master device transmits the end sub-frame 33, the master device uses the first operating frequency, which is utilized when the checking result is successful, as the clock frequency.

The content of the addressing information sub-frame 31 respectively in clock sequence are: a start bit ST, a device address signal SLA of the slave device, a write-in bit Wr, a response bit AKS (corresponding to the device address signal SLA) of the slave device, the combination of the continuous register address signal set (RegAdd1, RegAdd2, . . . , RegAddn) of the slave device and the response bit AKS (corresponding to the register address signals RegAdd1, RegAdd2, . . . , RegAddn) of the slave device, the repeat start bit RS, the device address signal SLA of the slave device, the reading bit Rd, and the response bit AKS (corresponding to the device address signal SLA) of the slave device, wherein n is the number of the registers in the slave device. The content of the reading data sub-frame 32 respectively in clock sequence are: the combination of the continuous reading data RD1, RD2, . . . , RDm read from the slave device and the response bit AKM (corresponding to the reading data RD1, RD2, . . . , RDm) of the master device, wherein m is the number of data written in the slave device. The end sub-frame 33 includes the stop bit SP.

Figure 4:
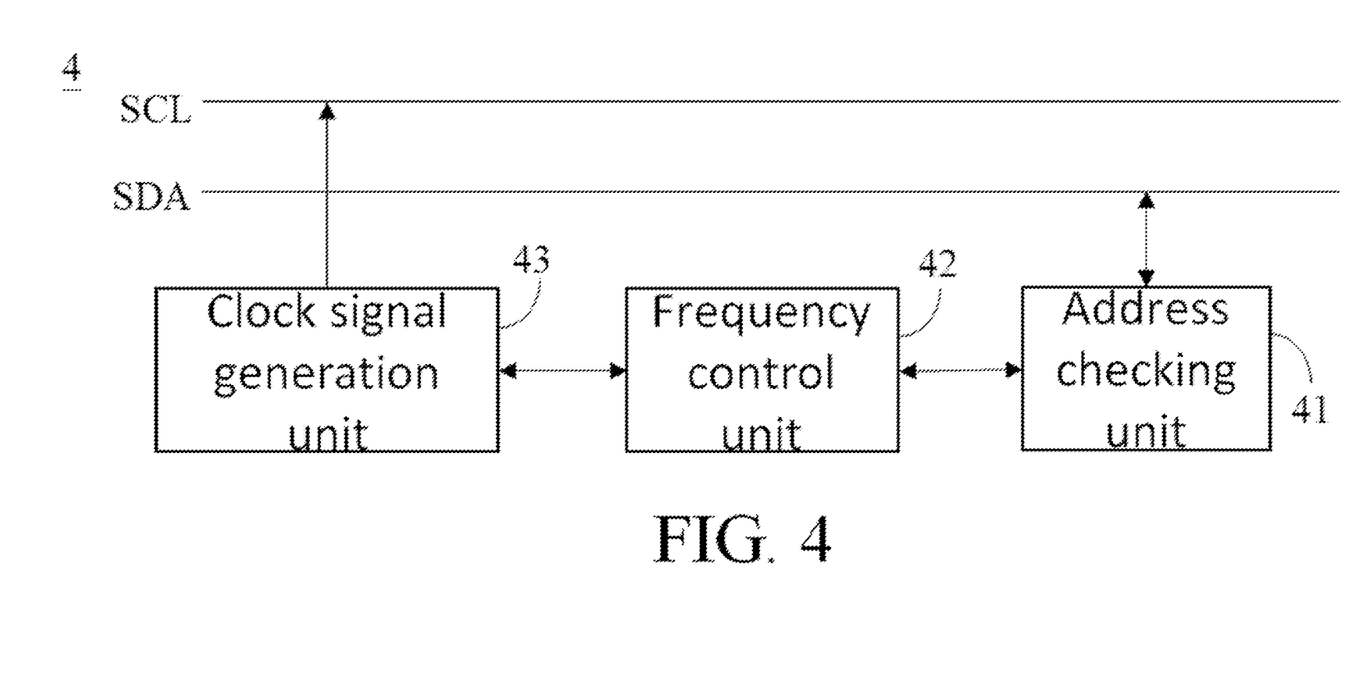
FIG. 4 is a block diagram of a clock frequency selecting device of the master device, according to an embodiment of the present disclosure.

Please continuously refer to FIG. 4, FIG. 4 is a block diagram of a clock frequency selecting device of the master device, according to an embodiment of the present disclosure. The clock frequency selecting device 4, used in the master device of the bus system, includes an address checking unit 41, a frequency control unit 42, and a signal generating unit 43, wherein the frequency control unit 42 is electrically connected between the address checking unit 41 and the clock signal generating unit 43. The address checking unit 41 is configured to check whether the master device successfully uses the clock frequency as the clock signal SCL of the first operating frequency to address the multiple slave devices (as an embodiment illustrated in FIG. 6, transmitting or accepting the data SDA to check whether checking address is successful), wherein the first operating frequency is defaulted as the maximum one among the multiple working clock frequencies of the multiple slave devices, and the working frequency of the slave device means the maximum clock frequency supported by the slave device. For example, if there are three working frequencies of the slave device respectively as 400 KHz, 100 KHz, and 50 KHz, then the first operating is defaulted as 400 KHz.

The frequency control unit 42 generates the first operating frequency setting signal based on the checking result, and generates the clock frequency selecting signal, wherein the checking result is generated by the address checking unit 41. The checking result is configured to present whether the master device successfully uses the clock frequency as the clock signal SCL of the first operating frequency to address the multiple slave devices. The clock signal generating unit 43 sets the first operating frequency of the clock signal SCL based on the first operating frequency, and sets the clock frequency as the first operating frequency or the second operating frequency based on the clock frequency selecting signal.

If the checking result is successful, the frequency control unit 42 controls the clock signal generating unit 43 to make the master device use the clock frequency as the clock signal SCL of the first operating frequency to address the multiple slave devices, and the frequency control unit 42 controls the clock signal generating unit 43 to make the master device use the clock frequency as the clock signal SCL of the second operating frequency to read/write from/to the multiple slave devices, wherein the second operating frequency is the minimum one among the multiple working clock frequencies of the multiple slave devices. For example, if there are three working frequencies of the slave device respectively as 400 KHz, 100 KHz, and 50 KHz, then the second operating frequency is defaulted as 50 KHz.

If the checking result is failed, then the frequency control unit 42 generates the first operating setting signal to reduce the first operating frequency, to make the address check unit check again whether the master successfully use the clock frequency as the clock signal SCL of the first operating frequency to address the multiple slave devices. After multiple addressing checks, until the checking result is successful, the master use the first operating frequency that the checking result is successful as the clock frequency to address the multiple slave devices, and uses the second operating frequency as the clock frequency to read/write data from/to the multiple slave devices.

When the checking result is failed, there are several embodiments for reducing the first operating frequency and the present invention is not limited thereto. In one embodiment, the maximum one among the multiple working clock frequencies is $2^n$ times the lowest one of the multiple operating clock frequencies, wherein n is an integer, and the reduced first operating frequency is $(½)^i$ times the maximum one among the multiple operating clock frequencies, wherein i is the number of checks when the checking result is successful, and this embodiment can be implement by using a frequency divider. In other embodiment, the reduced first operating frequency is the $(i+1)^{th}$ among the working clock frequencies sequence of the multiple of slave devices from high to low, wherein i is the number of checks to when the checking result is successful. In another embodiment, the maximum one among the multiple working clock frequencies is k times the lowest one among the multiple clock frequencies, wherein k is an integer, and the reduced first operating frequency is (k−i) times the lowest one among the multiple working clock frequencies, wherein i is the number of checks when the checking result is successful.

Furthermore, the method which the master device performs the address checking for each of the slave devices is described as below. The address checking unit 41 makes the master transmit the start bit, the device address signal of the slave device and the write-in bit to the slave device, and the address checking unit 41 will determine whether the master device accept a response bit transmitted by the slave device based on the start bit, the device address signal and the write-in bit. If the address checking unit 41 determines that the address checking unit 41 doesn't accept the response bit, the checking result is failed; if the address checking unit 41 accepts the response bit, then the address checking unit 41 makes the master device transmit an identification register address signal to the slave device, and the address checking unit 41 determines whether the master device accepts an another response bit transmitted by the slave device based on the identification register address signal.

If the address checking unit 41 determines that it doesn't accept the another response bit, then it make the checking result be failed; if the address checking unit 41 accepts the another response bit, then the address check unit 41 make the master device transmit the repeat start bit, the device address signal of the slave device and the reading bit, to read the identification from the slave device and to transmit the response bit of the master device to the slave device, and then the address checking unit 41 will determine whether the identification of the slave device is correct. If the identification of the slave device is not correct, then the checking result is failed; if the identification of the slave device is correct, then the address checking unit will make the master device transmit the stop bit, to finish that address checking of that slave device. The check result is successful only when each of the slave devices successfully passes the address checking and the checking result is failed as long as the address checking of any one slave device fails.

Figure 5:
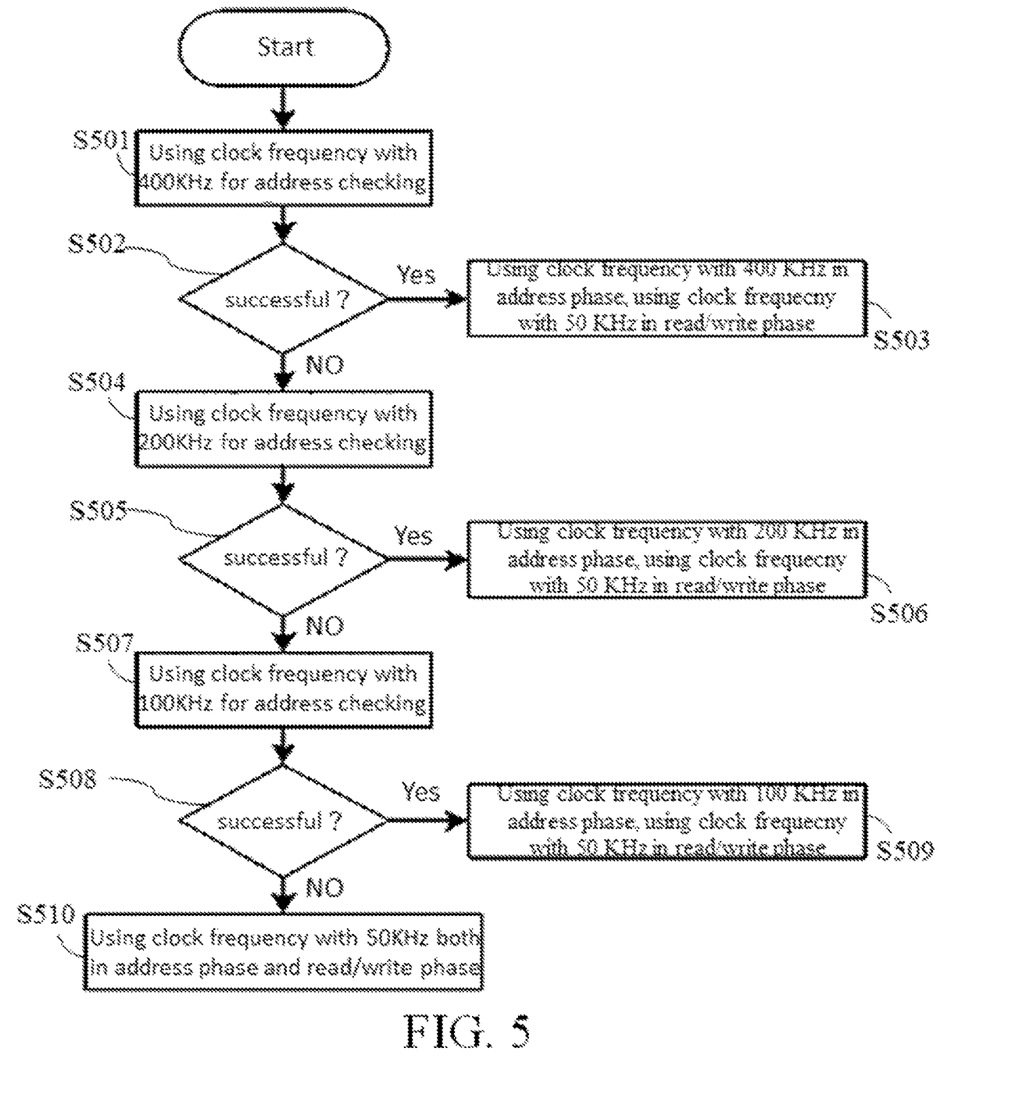
FIG. 5 is a flow chart of a method for selecting clock frequency in a master device of a bus system, according to an embodiment of the present disclosure.

Please refer to FIG. 5, FIG. 5 is a flow chart of a method for selecting clock frequency in a master device of a bus system, according to an embodiment of the present disclosure. In this embodiment, there are three slave devices, and the working frequencies of these three slave devices are respectively as 400 KHz, 100 KHz, 50 KHz, wherein 400 KHz eight times to 50 KHz, the first operating frequency is defaulted as 400 KHz, the second operating frequency is 50 KHz, and the way to reduce the first operating frequency is to divide the previous first operating frequency by 2.

First, in step S501, the master device uses a clock signal with a clock frequency 400 KHz to perform an addressing check to the three slave devices, and to generate the corresponding checking result. In step S502, whether the checking result is successful or failed is determined. If the checking result is successful, then in step S503, the master device uses the clock frequency 400 KHz in the address phase, and uses the clock frequency 50 KHz in the read/write phase. Otherwise, the first operating frequency is reduced to 200 KHz, and step S504 is executed.

In step S504, the master device uses a clock signal with a clock frequency 200 KHz to perform an addressing check to the three slave devices, and to generate the corresponding checking result. In step S505, whether the checking result is successful or failed is determined. If the checking result is successful, then in step S506, the master device uses the clock frequency 200 KHz in the address phase, and uses the clock frequency 50 KHz in the read/write phase. Otherwise, the first operating frequency is reduced to 100 KHz, and step S507 is executed.

In step S507, the master device uses the clock signal with the clock frequency 100 KHz to perform an addressing check to the three slave devices, and to generate the corresponding checking result. In step S508, whether the checking result is successful or failed is determined. If the checking result is successful, then in step S509, the master device uses the clock frequency with 100 KHz in the address phase, and uses the frequency with 50 KHz. Otherwise, step S510 is executed. The master uses a clock frequency with 50 KHz in both the address phase and the read/write phase.

Figure 6:
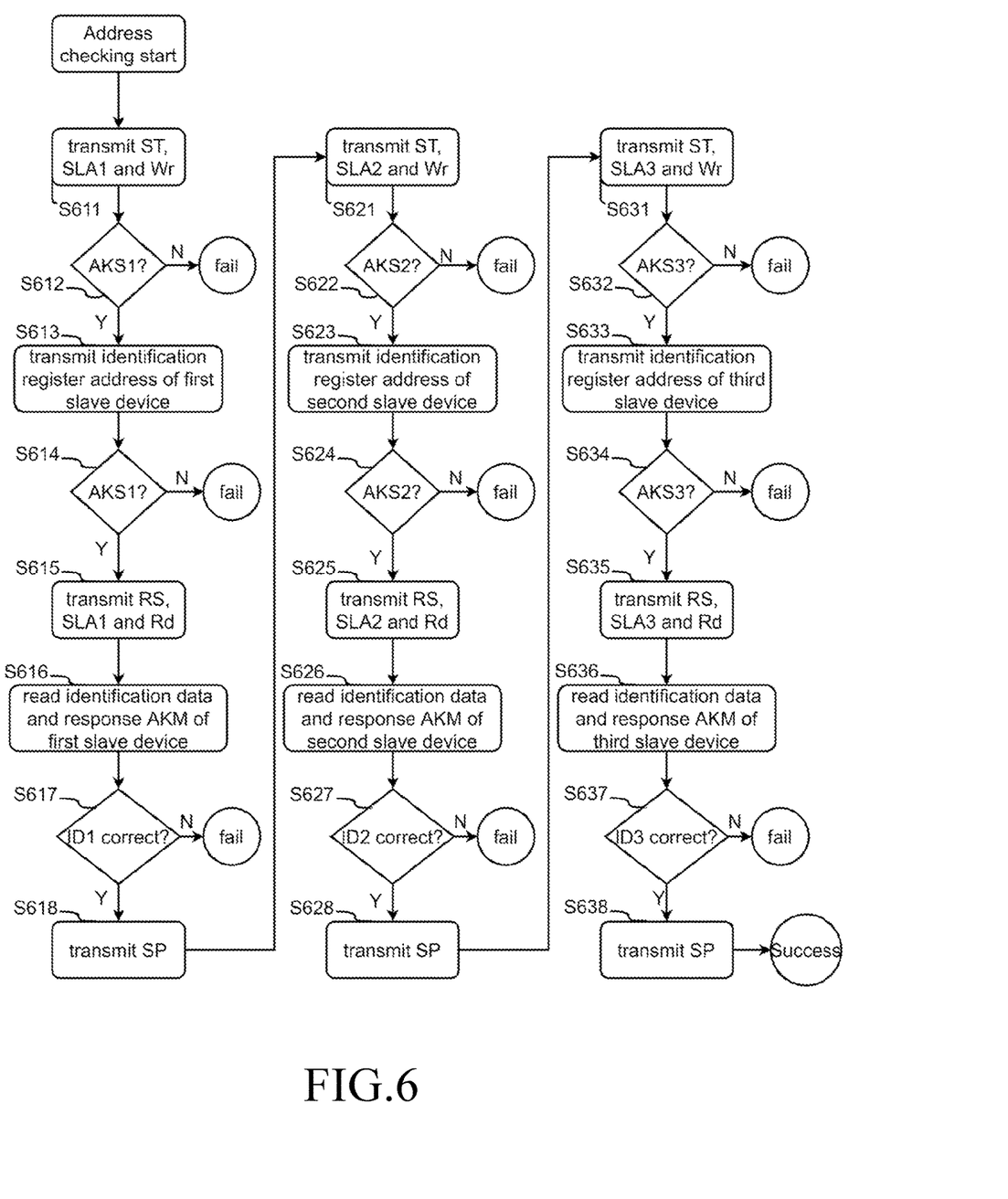
FIG. 6 is a flow chart of address checking of a method for selecting clock frequency, according to an embodiment of the present disclosure.

After that, please refer to FIG. 6, FIG. 6 is a flow chart of address checking of a method for selecting clock frequency, according to an embodiment of the present disclosure. In this embodiment, there are three slave devices, respectively as a first slave device, a second slave device, a third slave device, but the present disclosure is not limited thereto. First, in step S611, the master device transmits a start bit ST, a device address signal SLA1 of the first slave device, and the write-in bit Wr to the first slave device. Then, in step S612, whether the master device receives a response bit ASK1 transmitted by the first slave device based on the start bit ST, the device address signal SLA1 and write-in Wr is determined. If the address checking unit 41 determines that the master device does not receive the response bit, then it makes the checking result be failed. If the master device receives the response bit, then step S613 is executed. In step S613 the master device transmits an identification register address signal of the first slave device to the first slave device. In step S614, whether the master device receives another response bit ASK1 transmitted by the first slave device based on the identification register address signal is determined. If the address checking unit 41 determines that the master device does not receive another response bit ASK1, then the checking result is failed. If the master device receives another response bit ASK1, then step S615 is executed. In step S615, the master device transmits a repeat start signal RS, the device address signal SLA1 of the first slave device and reading bit Rd. In step S616, the master device reads the identification of the first slave device and transmits a response bit AKM of the master device to the first slave device. In step S617, whether the identification of the first slave device is correct is determined. If the identification of the first slave device is not correct, then the checking result is failed. If the identification of the slave device is correct, step S618 is executed. In step S618, the master device transmits a stop bit SP to finish the address checking of the first slave device.

Step S621 to Step S628 and S631 to S638 can be deduced from step S611 to S618 and so on, so there are not repeated. After the first slave device, the second slave device, and the third slave device are respectively checked for addressing, and successfully pass the check, the checking result is determined to be successful. As long as one of the slave device does not successfully pass the addressing check, then the checking result is failed.

In the view of the above, the device and method for selecting a clock frequency in a master device of a bus system provided by the embodiments of the present disclosure can allow a microcontroller with an ARM architecture to be used as the master device to address and read/write the different external I2C slave devices with different bit rates through an I2C bus. Therefore, the access speed and performance of the overall I2C bus system can be effectively improved.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A device for selecting clock frequency in a master device of a bus system, wherein the bus system includes the master device and a plurality of slave devices, the master device is connected to the slave devices via a bus, and the device for selecting clock frequency is comprising:

an address checking unit, configured to check whether the master device successfully uses a clock frequency as a clock signal of a first operating frequency to address the slave devices, wherein the first operating frequency is defaulted as the maximum one among a plurality of working frequencies of the slave devices, and wherein the working frequency of each of the slave device means a maximum clock frequency supported by the slave device respectively;

a frequency control unit, electrically connected to the address checking unit, configured to generate a first operating frequency setting signal based on a checking result which is configured to present whether the master slave successfully uses the clock frequency as the clock frequency of the first operating frequency to address the multiple slave devices, and generates a clock frequency selecting signal; and a clock signal generating unit, electrically connected to the frequency control unit, configured to set the first operating frequency of the clock signal based on the first operating frequency setting signal, and set the clock frequency as the first operating frequency or a second operating frequency based on the clock frequency selecting signal;

wherein, if the checking result is successful, the frequency control unit controls the clock signal generating unit to make the master device use the clock frequency as the clock signal of the first operating frequency to address the slave devices, and the frequency control unit controls the clock signal generating unit to make the master device use the clock frequency as the clock signal of the second operating frequency to read/write data from/to the slave devices, wherein the second operating frequency is the lowest among the working clock frequencies of the slave devices;

wherein, if the checking result is failed, the frequency control unit generates the first operating frequency setting signal for reducing the first operating frequency, to make the addressing checking unit check again whether the master device successfully uses the clock frequency as the clock signal of the first operating frequency to address the slave devices.

2. The device for selecting clock frequency according to claim 1, wherein the maximum of the working clock frequencies is $2^n$ times the lowest of the working clock frequencies, and n is an integer, and the reduced first operating frequency is $(½)^i$ times the maximum of the working clock frequencies, wherein i is a number of checks when the checking result is successful.

3. The device for selecting clock frequency according to claim 1, wherein the reduced first operating frequency is the (i+1)th among the working clock frequencies sequence of the slave devices from high to low, wherein i is a number of checks when the checking result is successful.

4. The device for selecting clock frequency according to claim 1, wherein the maximum of the working clock frequencies is K times the lowest of the working clock frequencies, and K is an integer, and the reduced first operating frequency is (K−i) times the lowest of the working clock frequencies, wherein i is a number of checks when the checking result is successful.

5. The device for selecting clock frequency according to claim 1, wherein performing an address checking for each of the slave devices comprises:

the address checking unit making the master device transmit a start bit, a device address signal of the slave device, and a writing bit to the slave device, and the address checking unit determines whether the master device receives a first response bit transmitted by the slave device based on the start bit, the device address signal of the slave device, and the writing bit;

the address checking unit making the master device transmit an identification register address signal to the slave device, and the address checking unit determines whether the master device receives a second response bit transmitted by the slave device based on the identification register address signal;

the address checking unit making the master device transmit a repeat start bit, the device address signal of the slave device, and a reading bit, to read an identification of the slave device and transmit a third response bit, and determined whether the identification of the slave device is correct; and the address checking unit making the master device transmit a stop bit.

6. A master device, comprising:
the clock frequency selection device of claim 1.

7. The master device according to claim 6, wherein the maximum of the working clock frequencies is $2^n$ times the lowest of the working clock frequencies, and n is an integer, and the reduced first operating frequency is $(½)^i$ times the maximum of the working clock frequencies, wherein i is a number of checks when the checking result is successful.

8. The master device according to claim 6, wherein the reduced first operating frequency is the (i+1)th among the working clock frequencies sequence of the slave devices from high to low, wherein i is a number of checks when the checking result is successful.

9. The master device according to claim 6, wherein the reduced first operating frequency is the (i+1)th among the working clock frequencies sequence of the slave devices from high to low, wherein i is a number of checks when the checking result is successful.

10. The master device according to claim 6, wherein performing an address checking for each of the slave devices comprises:

the address checking unit making the master device transmit a start bit, a device address signal of the slave device, and a writing bit to the slave device, and the address checking unit determines whether the master device receives a first response bit transmitted by the slave device based on the start bit, the device address signal of the slave device, and the writing bit;

the address checking unit making the master device transmit an identification register address signal to the slave device, and the address checking unit determines whether the master device receives a second response bit transmitted by the slave device based on the identification register address signal;

the address checking unit making the master device transmit a repeat start bit, the device address signal of the slave device, and a reading bit, to read an identification of the slave device and transmit a third response bit, and determined whether the identification of the slave device is correct; and the address checking unit making the master device transmit a stop bit.

11. The master device according to claim 6, wherein the master device is a microcontroller.

12. A bus system, comprising:
the master device according to claim 6; and
the slave devices.

13. The bus system according to claim 12, wherein the maximum of the working clock frequencies is $2^n$ times the lowest of the working clock frequencies, and n is an integer, and the reduced first operating frequency is $(½)^i$ times the maximum of the working clock frequencies, wherein i is a number of checks when the checking result is successful.

14. The bus system according to claim 12, wherein the reduced first operating frequency is the (i+1)th among the working clock frequencies sequence of the slave devices from high to low, wherein i is a number of checks when the checking result is successful.

15. The bus system according to claim 12, wherein the reduced first operating frequency is the (i+1)th among the working clock frequencies sequence of the slave devices from high to low, wherein i is a number of checks when the checking result is successful.

16. The bus system according to claim 12, wherein performing an address checking for each of the slave devices comprises:

the address checking unit making the master device transmit a start bit, a device address signal of the slave device, and a writing bit to the slave device, and the address checking unit determines whether the master device receives a first response bit transmitted by the slave device based on the start bit, the device address signal of the slave device, and the writing bit;

the address checking unit making the master device transmit an identification register address signal to the slave device, and the address checking unit determines whether the master device receives a second response bit transmitted by the slave device based on the identification register address signal;

the address checking unit making the master device transmit a repeat start bit, the device address signal of the slave device, and a reading bit, to read an identification of the slave device and transmit a third response bit, and determined whether the identification of the slave device is correct; and the address checking unit making the master device transmit a stop bit.

17. The bus system according to claim 12, wherein the slave device includes a first partial circuit and a second partial circuit, the first partial circuit is a digital circuit, and the second partial circuit is an analog circuit or another digital circuit.

18. A method for selecting clock frequency utilized in a master device of a bus system, wherein the bus system includes the master device and a plurality of slave devices, wherein the master device is connected to the slave devices via a bus, and the method for selecting clock frequency comprises:

checking whether the master device successfully use a clock frequency as a clock signal of a first operating frequency to address the slave devices, wherein the first operating frequency is defaulted as the maximum one among a plurality of working clock frequencies of the slave devices, and wherein the working frequency of each of the slave devices means a maximum clock frequency supported by the slave device respectively;

if a checking result is successful, the master device uses the clock frequency as the clock signal of the first operating frequency to address the slave devices, and the master device uses the clock frequency as the clock signal of a second operating frequency to read/write data from/to the slave devices, wherein the second operating frequency is the lowest among the working clock frequencies of the slave devices; and if the checking result is failed, the first operating frequency is reduced to check again whether the master device successfully uses the clock frequency as the clock signal of the first operating frequency to address the slave devices.

* * * * *